US008002537B2

(12) United States Patent
Seifert et al.

(10) Patent No.: US 8,002,537 B2
(45) Date of Patent: Aug. 23, 2011

(54) SYSTEM FOR THE PRODUCTION OF PREFORMS MADE OF POWDER MATERIAL, IN PARTICULAR TABLETS

(75) Inventors: Werner Seifert, Wentorf (DE); Ingo Schmidt, Schwarzenbek (DE); Joachim Greve, Pogeez (DE); Alexander Oldenburg, Schwarzenbek (DE)

(73) Assignee: FETTE GmbH, Schwarzenbek (DE)

(*) Notice: Subject to any disclaimer, the term of this patent is extended or adjusted under 35 U.S.C. 154(b) by 496 days.

(21) Appl. No.: 12/176,044

(22) Filed: Jul. 18, 2008

(65) Prior Publication Data

US 2009/0026897 A1 Jan. 29, 2009

(30) Foreign Application Priority Data

Jul. 24, 2007 (DE) ........................ 10 2007 034 359

(51) Int. Cl.
*B29C 43/08* (2006.01)

(52) U.S. Cl. ........................ 425/345; 425/353; 100/102

(58) Field of Classification Search .................. 425/345, 425/353–355; 100/102
See application file for complete search history.

(56) References Cited

U.S. PATENT DOCUMENTS

| | | | | |
|---|---|---|---|---|
| 5,916,504 | A * | 6/1999 | Edwards et al. | 264/71 |
| 6,106,262 | A * | 8/2000 | Levin et al. | 425/345 |
| 6,116,889 | A * | 9/2000 | Pagel et al. | 425/345 |
| 6,201,690 | B1 * | 3/2001 | Moore et al. | 361/679.21 |
| 6,442,030 | B1 * | 8/2002 | Mammoser et al. | 361/727 |
| 7,158,378 | B2 * | 1/2007 | Hinzpeter et al. | 361/695 |
| 7,343,815 | B2 * | 3/2008 | Kramer | 73/821 |
| 7,364,420 | B2 * | 4/2008 | Luneburg et al. | 425/345 |

FOREIGN PATENT DOCUMENTS

| | | |
|---|---|---|
| DE | 103 21 022 A1 | 9/2004 |
| DE | 10 2004 040 163 B3 | 5/2006 |

* cited by examiner

*Primary Examiner* — Robert B Davis
*Assistant Examiner* — Thu Khanh T Nguyen
(74) *Attorney, Agent, or Firm* — Vidas, Arrett & Steinkraus P.A.

(57) ABSTRACT

System for the production of preforms made of a powder material, in particular tablets, with a rotary tablet press, which is arranged in a housing supported by a frame in the housing, wherein an electric drive motor is integrated into the rotor of the tablet press and the rotor is swivel-mounted on a middle column of the frame, and a control cabinet for the tablet press, which contains among other things a machine computer for the operation of the tablet press, wherein the middle column is supported on a horizontal load-bearing element, which is arranged at a distance above a base plate placed on the floor and the control cabinet is arranged in the interim space between the horizontal load-bearing element and the base plate.

7 Claims, 1 Drawing Sheet

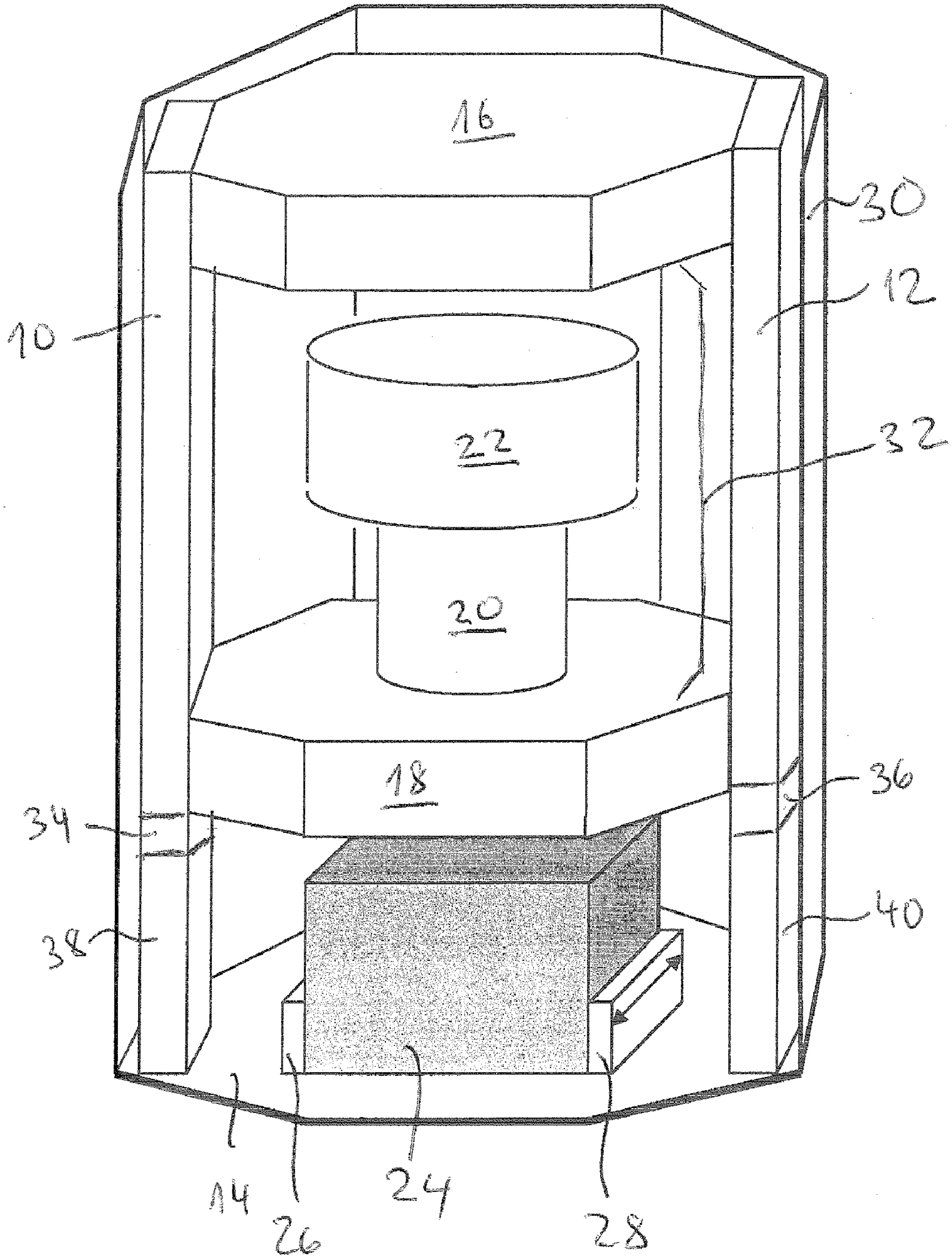
16
30
12
10
22
32
20
18
36
34
38
40
14
26
24
28

SYSTEM FOR THE PRODUCTION OF PREFORMS MADE OF POWDER MATERIAL, IN PARTICULAR TABLETS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The system according to the invention uses a rotary tablet press as has been known for a long time. It contains a rotor driven in a rotary manner by a drive motor, in which the top and bottom stamps are maintained and a die plate is held, with which the stamps work. The stamps are guided or actuated by means of pressing rollers and guide cams.

The tablet press naturally requires an energy supply and controls or regulators. A machine computer is normally used for the latter. In the state of the art, a control cabinet is either placed separately next to the tablet press or is attached laterally to the housing of the tablet press. It is known from DE 103 21 022, the entire contents of which is incorporated herein by reference, to incorporate a control cabinet, which also contains ventilation means for the control cabinet and the tablet press, on the outside of the housing of a tablet press in the bottom area in a hood.

The arrangement of the control cabinet is determined from the arrangement of the components in the housing of the tabletting machine. However, the conventional structure has its disadvantages. Connection lines to the machine are needed in the case of a separate control cabinet. This takes a lot of effort. Moreover, an additional assembly area is required for the control cabinet. Furthermore, the space between the control cabinet and the tablet press, in which the lines are maintained, can also not be used. The connection lines, which may lie on the floor, also interfere with the operation of the system.

Control cabinets attached to the side of the housing also take up more space. Moreover, access to the tablet press on the side of the control cabinet is impeded or impossible.

The object of the invention is to create a system for the production of preforms in a rotary tablet press, which takes up less space and also requires less effort to install.

BRIEF SUMMARY OF THE INVENTION

In the system according to the invention, the middle column supporting the rotor is supported on a horizontal load-bearing element, which is arranged at a distance above a base plate positioned on the ground. The control cabinet is arranged in the interim space between the horizontal load-bearing element and the base plate.

The invention takes advantage of the fact that the electrical drive motor for the rotor is integrated into the rotor. This type of design is known from DE 10 2004 040 163, the entire contents of which is incorporated herein by reference. The stator of the motor is supported on a column, while the runner is connected in a torque-proof manner with it in a recess of the rotor. The rotor in turn is swivel-mounted on the column. In the case of this type of drive design, the control cabinet can be integrated into the tablet press without changing the exterior shape of the tablet press or its housing. The control cabinet is placed below the process room, in an area, in which the main drive is also arranged in accordance with conventional design. Due to the integration of the drive in the motor, a bothersome motor or a bothersome gearbox below the process room is omitted.

The invention has the advantage that the process area and the “technical area” are separated. There is unrestricted access to the process area from all sides of the housing, since there is no control cabinet in the way. An additional installation space and external cable connections are not required. The compact structure reduces the effort needed to install the system. Furthermore, a smaller installation space is required for the system. External cable connections between the control cabinet and the tablet press are not needed. The only thing required is power supply to the control cabinet from outside via cables. The actuation of control means in the control cabinet via a remotely arranged control panel can also take place without cable connections, when, as is generally known, a wireless transmission line (radio link) is established between the control panel and the control cabinet or the tablet press.

According to one embodiment of the invention, the control cabinet is designed to be able to be moved out of the interim space. For this purpose, in accordance with a further embodiment of the invention, a pair of rails can be arranged on the base plate, and rollers or sliding elements are attached to the control cabinet, which are in contact with the rails. Telescoping rails are preferably provided. Thus, the control cabinet can be pulled out along its entire length in order to be able to perform work on it. Advantageously, the cable connections between the control cabinet and the aggregates of the tablet press are flexible and longer than those required to bridge the distance. Thus, the cable connections do not need to be disconnected when the control cabinet is moved out of the interim space.

It is provided according to a further embodiment of the invention that the frame is coupled with the base plate via damping elements. Oscillations in the frame are thus highly dampened on the base plate based on the operation of the tablet press and are thereby transferred to the control cabinet.

BRIEF DESCRIPTION OF THE VIEW OF THE INVENTION

FIG. 1 shows a schematic view of the tablet press in accordance with the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In the FIGURE, two parallel, vertical columns 10, 12 are supported on a base plate 14. The support preferably takes place via damping elements (not shown). A first octagonal load-bearing element 16 is connected with the top end of the supports 10, 12 on opposite sides. A second load-bearing element 18 with a similar structure and the same contour is connected with the supports 10, 12 at a separation distance below the load-bearing element 16. A column 20, which mounts a rotor 22 of a rotary tablet press, is located in the middle of the load-bearing element 18. The rotor 22 is indicated here very schematically and will not be described in greater detail. Its principle structure is generally known. An electric drive motor (not shown), the interior stator of which is supported on the column 20 and the runner of which is in rotary union with the rotor 22, is located inside the rotor 22. As already mentioned, this type of arrangement is known from DE 10 2004 040 163, the entire contents of which is incorporated herein by reference.

The bottom load-bearing element 18 is located at a distance from the base plate 14, whereby an interim space is formed. A control cabinet 24 for the tablet press is housed in this interim space. It contains all parts, which are normally required for a control cabinet of a tablet press, in particular a machine computer. Sliding elements or rollers (not shown), which work together with telescoping rails 26 or 28, are arranged on opposite sides of the rectangular control cabinet 24 in order to be able to move the control cabinet 24 out. Connection lines, which go from the control cabinet to the drive motor and other electrically operated parts of the tablet press, are not shown. They are longer than those required for the space between the control cabinet and the respective parts so that the associated clamps do not need to be released when the control cabinet 24 is moved out.

As indicated by 30, the complete frame of the tablet press is surrounded by a housing, both laterally as well as on the top side. The housing 30 thereby forms a type of hood. The process room, which is located between the load-bearing elements 16, 18, is also arranged within a housing, which is indicated by 32. The process room is consequently completely separated from the space, in which the control cabinet is housed.

The columns 10, 12 are supported on a base frame 38, 40, which sits on the base plate 14, via damping elements 34, 36. The control cabinet is thereby largely uncoupled from the oscillations of the frame on which the rotor 22 is mounted.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. System for the production of preforms made of a powder material, in particular tablets, with a rotary tablet press, which is arranged in a housing supported by a frame in the housing, wherein an electric drive motor is integrated into the rotor of the tablet press and the rotor is swivel-mounted on a middle column of the frame, and a control cabinet for the tablet press, which contains among other things a machine computer for the operation of the tablet press, characterized in that the middle column (20) is supported on a horizontal load-bearing element (18), which is arranged at a distance above a base plate (14) placed on the floor and the control cabinet (24) is arranged in the interim space between the horizontal load-bearing element (18) and the base plate (14).

2. System according to claim 1, characterized in that the control cabinet (24) is designed such that it can be removed from the interim space.

3. System according to claim 2, characterized in that rails (26, 28) are arranged on the base plate (14) and rollers or sliding elements, which engage with the rails (26, 28), are attached to the control cabinet (24).

4. System according to claim 3, characterized in that telescoping rails are provided.

5. System according to claim 2, characterized in that flexible cables are laid between the control cabinet (24) and electric or electronic components of the tablet press with a length that is greater than the distance between the control cabinet and the concerned components.

6. System according to claim 1, characterized in that the frame (10, 12, 16, 18) is connected with the base plate (14) via damping elements (34, 36).

7. System according to claim 1, characterized in that a process room surrounded by a housing (30) is formed between a second load-bearing element arranged at a distance above the first load-bearing element.

* * * * *